US012679212B2

(12) United States Patent
Pritscher et al.

(10) Patent No.: US 12,679,212 B2
(45) Date of Patent: Jul. 14, 2026

(54) SWITCHING DEVICE FOR A MULTI-POLE HIGH-VOLTAGE VEHICLE POWER SUPPLY OF AN ELECTRICALLY OPERABLE MOTOR VEHICLE, ELECTRONIC CONTROL UNIT, AND MOTOR VEHICLE

(71) Applicant: Bayerische Motoren Werke Aktiengesellschaft, Munich (DE)

(72) Inventors: Florian Pritscher, Landshut (DE); Christian Schardax, Garsten Nord (AT); Bjoern Wahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 214 days.

(21) Appl. No.: 18/277,625

(22) PCT Filed: Apr. 13, 2022

(86) PCT No.: PCT/EP2022/059822
§ 371 (c)(1),
(2) Date: Aug. 17, 2023

(87) PCT Pub. No.: WO2022/238077
PCT Pub. Date: Nov. 17, 2022

(65) Prior Publication Data
US 2024/0123831 A1     Apr. 18, 2024

(30) Foreign Application Priority Data

May 11, 2021     (DE) ..................... 10 2021 112 268.6

(51) Int. Cl.
*H02H 3/08* (2006.01)
*B60L 3/04* (2006.01)
(Continued)

(52) U.S. Cl.
CPC ..................................... *B60L 3/04* (2013.01); *H02H 7/20* (2013.01)

(58) Field of Classification Search
CPC ................................... B60L 3/04; H02H 7/20
(Continued)

(56) References Cited

U.S. PATENT DOCUMENTS 10,239,410 B2 * 3/2019 Kristof ................. G01R 31/388
2017/0069450 A1 3/2017 Birner et al.
(Continued)

FOREIGN PATENT DOCUMENTS

CN 110316008 A 10/2019
DE 10 2013 017 409 A1 7/2014
(Continued)

OTHER PUBLICATIONS

PE2E Translation of DE 10 2014 208 696, Hezrog Torsten, Dec. 11, 2015.*

(Continued)

*Primary Examiner* — Crystal L Hammond
*Assistant Examiner* — Lucy M Thomas
(74) *Attorney, Agent, or Firm* — Crowell & Moring LLP

(57) ABSTRACT

A switching device for a multi-pole high-voltage vehicle power supply of an electrically operable motor vehicle is provided. The switching device includes at least one first electromechanical switch assigned to a first pole of at least one high-voltage accumulator, and having at least one second electromechanical switch assigned to a second pole of at least one high-voltage accumulator, wherein a first switch and a second switch have a different design and are designed to meet a first defined requirement together, and wherein at least one of the two switch types—here referred to as the first switch—is designed so as meet at least a second defined requirement on its own.

8 Claims, 2 Drawing Sheets

(51) Int. Cl.
   *H02H 7/20*          (2006.01)
   *H02H 9/02*          (2006.01)
(58) Field of Classification Search
   USPC ........................................................ 361/93.1
   See application file for complete search history.

(56)                References Cited

U.S. PATENT DOCUMENTS

| | | | |
|---|---|---|---|
| 2018/0167001 A1* | 6/2018 | Olsson ...................... H02P 3/04 |
| 2018/0254159 A1* | 9/2018 | Shi ........................ H01H 33/666 |
| 2019/0126761 A1 | 5/2019 | Verbridge |
| 2019/0277904 A1 | 9/2019 | Fan et al. |
| 2020/0180470 A1 | 6/2020 | Doersam et al. |
| 2020/0227220 A1 | 7/2020 | Oehler et al. |
| 2021/0146791 A1* | 5/2021 | Hinterberger ......... B60L 15/007 |
| 2022/0314833 A1 | 10/2022 | Jiang et al. |
| 2023/0178308 A1 | 6/2023 | Pritscher et al. |

FOREIGN PATENT DOCUMENTS

| | | |
|---|---|---|
| DE | 10 2014 208 696 A1 | 11/2015 |
| DE | 10 2016 008 052 A1 | 2/2017 |
| DE | 10 2017 122 008 A1 | 3/2019 |
| DE | 10 2017 219 169 A1 | 4/2019 |
| DE | 11 2018 005 101 T5 | 8/2020 |
| DE | 10 2020 118 308 A1 | 1/2022 |
| DE | 10 2020 124 784 A1 | 3/2022 |
| EP | 1 402 548 B1 | 7/2017 |
| EP | 3 496 126 B1 | 8/2020 |
| EP | 3 716 304 A1 | 9/2020 |

OTHER PUBLICATIONS

International Search Report (PCT/ISA/210) issued in PCT Application No. PCT/EP2022/059822 dated Sep. 2, 2022 with English translation (5 pages).

German-language Written Opinion (PCT/ISA/237) issued in PCT Application No. PCT/EP2022/059822 dated Sep. 2, 2022 with English translation (9 pages).

German-language Search Report issued in German Application No. 10 2021 112 268.6 dated Nov. 25, 2021 with partial English translation (12 pages).

Chinese-language Office Action issued in Chinese Application No. 202280011691.8 dated Jul. 31, 2025, with English translation (12 pages).

Chinese-language Office Action issued in Chinese Application No. 202280011691.8 dated Apr. 3, 2026 with English translation (13 pages).

\* cited by examiner

SWITCHING DEVICE FOR A MULTI-POLE HIGH-VOLTAGE VEHICLE POWER SUPPLY OF AN ELECTRICALLY OPERABLE MOTOR VEHICLE, ELECTRONIC CONTROL UNIT, AND MOTOR VEHICLE

BACKGROUND AND SUMMARY OF THE INVENTION

The invention relates to a switching device for a multi-pole high-voltage vehicle power supply of an electrically operable motor vehicle. The invention further relates to an electronic control unit, and to an electrically operable motor vehicle.

In the present case, the focus is vehicle power supply systems, particularly high-voltage vehicle power supply systems for electrically operable motor vehicles. Vehicle power supply systems of this type comprise electric switches (e.g., relays or contactors) for the electrical connection of power supply system components (e.g., electric drive motors or high-voltage battery modules, etc.) to power supply lines. In the event of a defect or malfunction in a vehicle power supply system component, it can occur that a fault current, in the form of an overcurrent, flows via the associated power supply line, which can further damage the power supply line of the defective vehicle power supply system component, together with the vehicle power supply system component itself.

From the prior art, it is therefore known for switching devices to be employed which trip in response to the presence of an overcurrent, and can isolate the defective vehicle power supply system component from the vehicle power supply system. Switching devices of this type can comprise, for example, relays, contactors or fuses. The design rating of contactors or relays is customarily focused on the provision of a high breaking capacity.

An object of the present invention is the provision of a secure and cost-effective switching device for a high-voltage vehicle power supply system of a motor vehicle, which simultaneously fulfils a number of stipulated requirements.

According to the invention, this object is fulfilled by a switching device, an electronic control unit and a motor vehicle having the features disclosed in the respective independent patent claims. Advantageous embodiments of the invention are the subject matter of the dependent patent claims, the description and the figures.

The switching device according to the invention for a multi-pole (e.g., two-pole) high-voltage vehicle power supply system of an electrically operable motor vehicle comprises, for a first pole (e.g., a positive pole), a first electro-mechanical switch and, for a second pole (e.g., a negative pole), a second electromechanical switch, wherein the switches are differently configured and are designed to fulfil a common first requirement (e.g., provision of a two-pole breaking capability), and wherein the first switch is configured such that the latter alone fulfils a second requirement (e.g., provision of an on-load breaking capability up to a specified operating voltage limit). In other words, the "first switch" and the "second switch" are switches of two different types. The "first switch" is thus a first of two types of switches.

In an advantageous further development of the invention, the first and second switches, particularly for the fulfilment of the common first requirement in the form of a two-pole breaking capability, are respectively provided with an actuator which is actuatable by means of a low-voltage supply, in order to connect or interrupt all (e.g., both) power supply lines of the high-voltage vehicle power supply system.

In a further advantageous configuration of the invention, the second switch is configured such that it exclusively fulfils at least one third requirement (e.g., a bounce-free switch-in capability up to a stipulated voltage differential threshold).

In a further advantageous configuration of the invention, the first switch is further configured such that, in the event of a failure of the low-voltage supply to the actuator, it opens automatically.

In a further advantageous configuration of the invention, the second switch is further configured such that, in the event of a failure of the low voltage supply to the actuator, it remains closed.

In other words, both switches (or types of switches), on the one hand, fulfil respectively different requirements and, on the other, fulfil common requirements.

The invention is based upon the following considerations:

PRIOR ART

To date, for each switch position in a high-voltage vehicle power supply system, identical switches ("switching devices") have generally been employed, each of which fulfils all requirements for switches in a high-voltage vehicle power supply system. No targeted division of functions, as per the subject matter of the invention, is executed.

By means of the invention, inter alia, it is intended that the following objectives should be achieved:

Inrush withstand upon parallel connection,

Inrush withstand during normal precharging,

Inrush withstand during DC charging,

Reduction of holding power, according to the operating context, by up to 20 watts, Reduction of contact resistances, and a resulting high-power capability, Maintenance of breaking capacity, notwithstanding internal insulation faults (at least at 800 V), Mechanical impact resistance.

Potential configurations of a first and second switch are described, for example, in patent applications 10 2020 124 784 and 10 2020 118 308 of the applicant, which have not been published in the prior art. Advantageous configurations are also represented in the exemplary embodiment.

The invention is described in greater detail hereinafter, with reference to a preferred exemplary embodiment and with reference to the drawing. In the drawings:

DETAILED DESCRIPTION OF THE DRAWINGS

In the figures, identical or functionally equivalent elements are identified by the same reference symbols.

Figure 1:
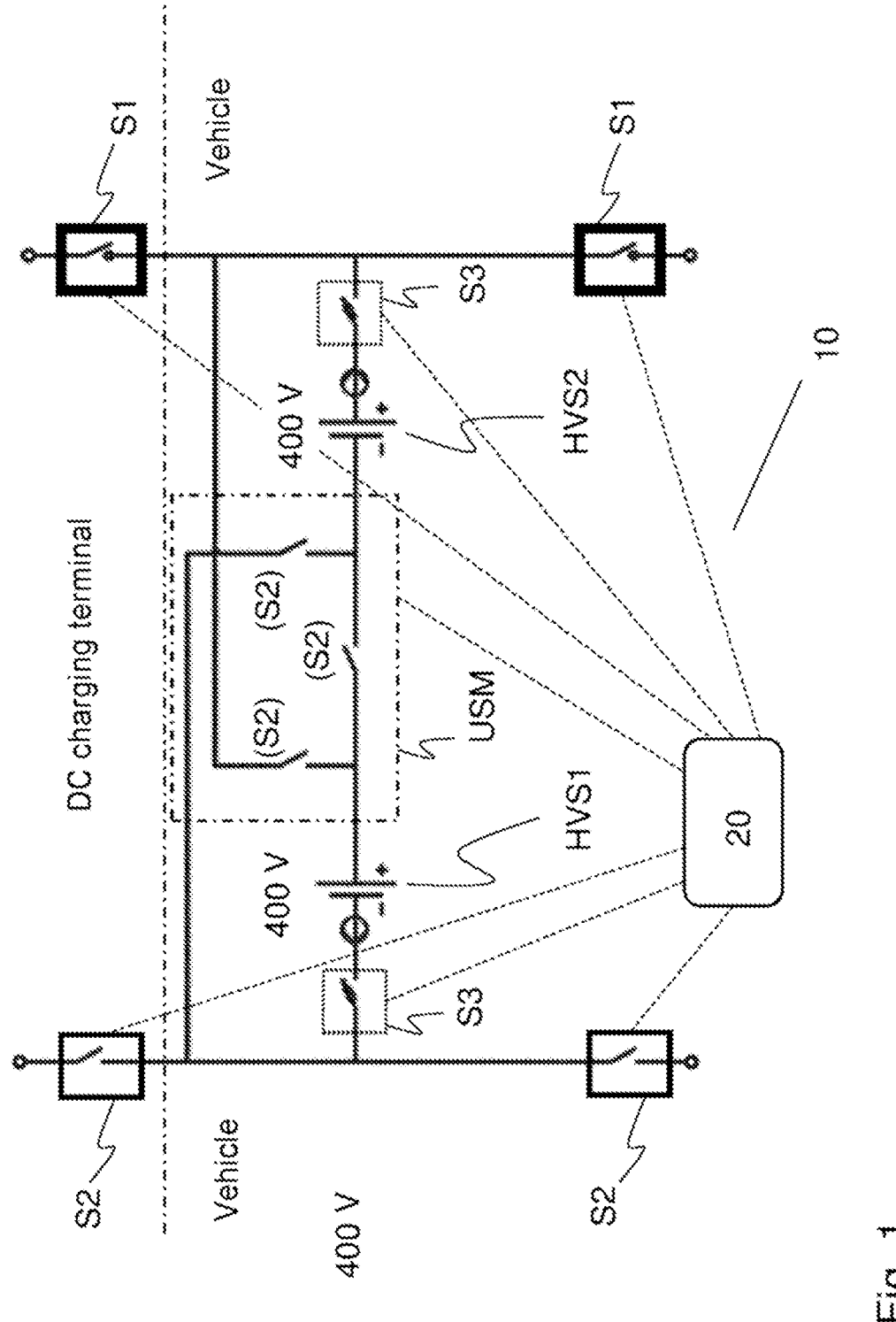
FIG. 1 shows a schematic representation of an exemplary application of an overall switching device according to the invention.

FIG. 1 represents a switching device 10 for a two-pole high-voltage vehicle power supply system of an electrically operable motor vehicle. The high-voltage vehicle power supply system comprises two high-voltage stores HVS1 and HVS2, each having a nominal voltage of approximately 400

V. The high-voltage vehicle power supply system further comprises a changeover matrix USM (in this case, having three further switches), by means of which the two high-voltage stores HVS1 and HVS2 are connectable either in series or in parallel. In particular, upon the connection of the vehicle to a DC charging terminal, charging at 800 V can thus be permitted.

For charging at such a high voltage or capacity (with a limiting operating current of approximately 1 kA), for reasons of safety, it is necessary for stipulated requirements to be observed. A first requirement, in particular, is a capability for the common isolation of the positive and negative poles from the charging source (two-pole breaking capability). A second requirement is a breaking capability up to the limiting operating current (or the order of magnitude of 1 kA). A third requirement is a bounce-free switch-in capability. A further requirement is the interruption of the high-voltage supply, in the event of a failure of the (low-voltage) supply to the actuators for the switch-on and switch-off of the high-voltage supply associated with a malfunction.

Known high-voltage vehicle power supply systems have previously employed identical switches for the fulfilment of all these requirements, wherein each switch is capable of fulfilling all requirements. The invention relates to the employment of differently configured switches which, in combination, fulfil all requirements, and which assume specific sub-functions.

To this end, first electromechanical switches S1 are assigned to the positive poles (+) of the high-voltage stores HVS1 and HVS2, and second electromechanical switches S2 are assigned to the negative poles (–) of the high-voltage stores HVS1 and HVS2. The switches S1 and S2 are differently configured and, to this end, are designed to fulfil a first specified and common requirement, particularly a two-pole breaking capability, wherein only one of the two types of switches (in this case, the switches S1 which are assigned to the positive poles (+)) are configured for the exclusive fulfilment of a second specified requirement. Preferably, the second specified requirement is a breaking capability up to the limiting operating current. Accordingly, with respect to capacity, the second type of switches, i.e., the switches S2 which are assigned to the negative poles, can be configured with a less robust, and consequently more cost-effective design rating than the first type of switches (S1 switches).

Conversely, the second type of switches (or the second switches S2 which are assigned to the negative poles) are preferably configured such that they exclusively fulfil a specified third requirement, particularly a bounce-free switch-in capability. With respect hereto, in turn, the first type of switches can be configured with a simpler design.

Both types of switches S1 and S2 are respectively provided with an actuator A1 and A2 which is actuatable by means of a low-voltage supply (12 V), in order to connect or interrupt the supply lines of the high-voltage vehicle power supply system.

Figure 2:
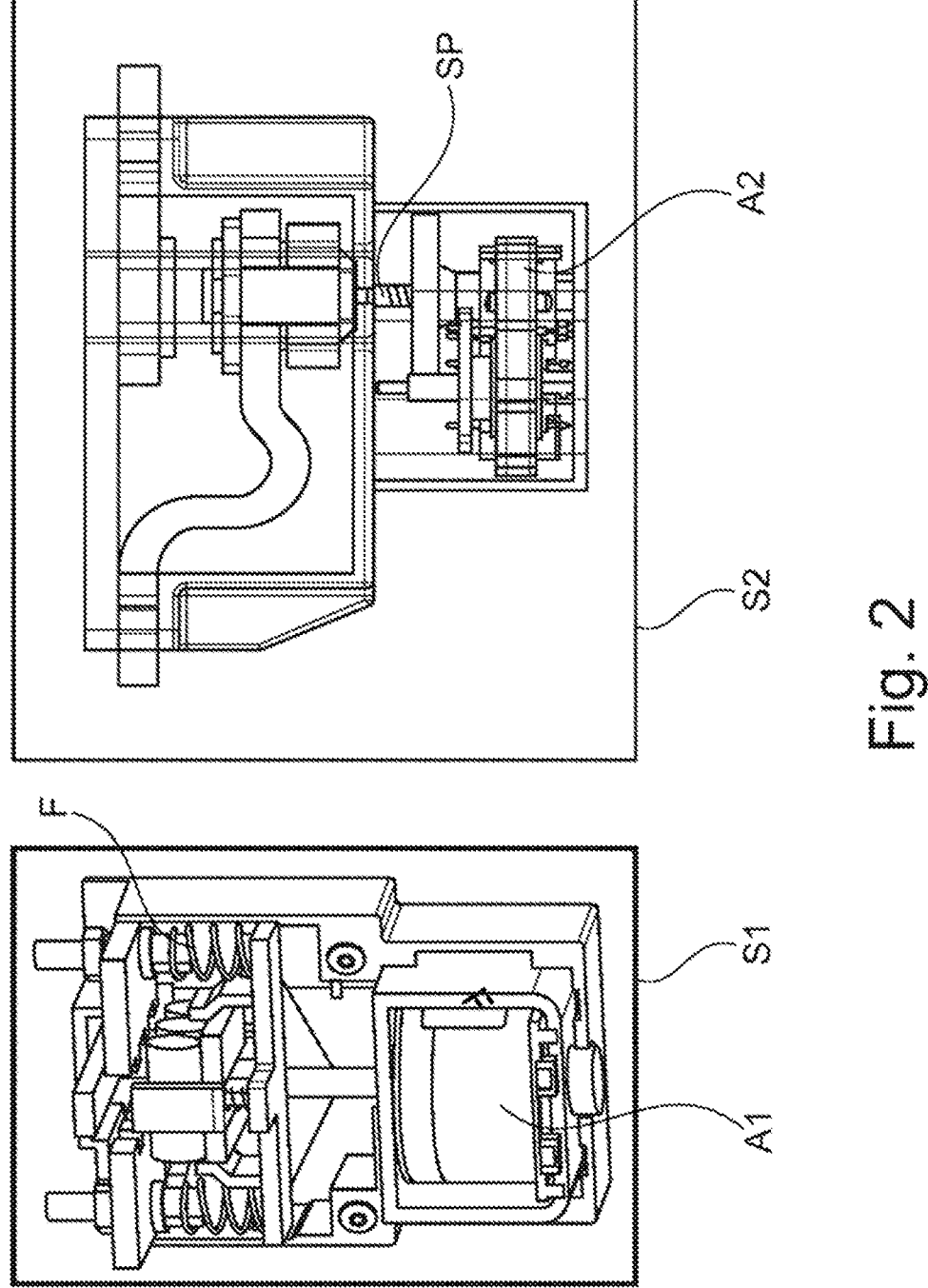
FIG. 2 shows examples of advantageous configurations of a first and second switch of the switching device according to the invention.

The first switch S1 (or the first type of switch) is further configured such that, in the event of the failure of the low-voltage supply to the actuator A1, it opens automatically. The first switch S1 thus comprises, for example, a return spring F for the opening thereof in the event of a failure of the low-voltage supply to the actuator A1, wherein the actuator A1, in particular a solenoid, is de-energized and unpowered, and thus does not counteract the return spring F (c.f. FIG. 2, left-hand side).

The second switch S2 (or the second type of switch) is further configured such that, in the event of the failure of the low-voltage supply to the actuator A2, it remains closed. The second switch S2 thus comprises no return spring for the opening thereof in the event of a failure of the low-voltage supply to the actuator A2, wherein the actuator A2, particularly an electric motor having a self-locking spindle SP, being de-energized, remains in its current position (c.f. FIG. 2, right-hand side).

Both switches (or types of switches) S1 and S2 thus fulfil, on the one hand, respectively differing requirements and, on the other hand, also fulfil common requirements.

Optionally, a third switch S3, in the form of a known pyro switch, can be provided for short-circuit protection.

The switches of the changeover matrix USM can optionally assume the same design as the second switches S2.

In FIG. 2, for each switch S1 and S2, or for each type of switch, a particularly advantageous configuration is represented.

A configuration of a first switch S1 is represented on the left-hand side, and a configuration of a second switch S2 is represented on the right-hand side. However, the invention is not limited to these configurations of both types of switches.

An advantageous design of a first switch S1 is as follows:
e.g., Schaltbau multi-contact contactor with the following properties:
Breaking capability up to the limiting operating current (approximately 1 kA)
Contact resistance approximately 50 uOhms, holding power approximately 5 W
Automatic opening in the event of the loss of the 12 V supply An advantageous design of a second switch S2 is as follows:
e.g., Sonceboz actuator (single contact with brushless DC motor)
Switch-in capability up to a voltage differential of 10 V
Contact resistance approximately 30 uOhms, holding power 0 W
Remains closed in the event of the loss of the 12 V supply
Mechanical impact-resistance in the open state An advantageous design of an optional third switch S3 (not represented here in greater detail, on the grounds that the employment of pyro switches for short-circuit protection is already extensively known) is as follows:
e.g., Daicel pyro switch
Breaking capability up to a full short-circuit current of approximately 15 kA
Contact resistance approximately 30 uOhms.

The invention claimed is:

1. A switching device for a multi-pole high-voltage vehicle power supply system of an electrically operable motor vehicle, the switching device comprising:
at least one first electromechanical switch which is assigned to a first pole of a first high-voltage store;
at least one second electromechanical switch which is assigned to a second pole of a second high-voltage store;
a third electromechanical switch disposed between the first high-voltage store and the at least one second electromechanical switch;
a fourth electromechanical switch disposed between the second high-voltage store and the at least one first electromechanical switch; and

a changeover matrix disposed between the at least one first electromechanical switch and the at least one second electromechanical switch, the changeover matrix including a plurality of switches arranged to provide for a series connection between the first and second high-voltage stores and a parallel connection between the first and second high-voltage stores based on which of the plurality of switches are open and closed;

wherein the at least one first electromechanical switch and the at least one second electromechanical switch are configured with a two-pole breaking capability;

wherein only the at least one first electromechanical switch is configured with an on-load breaking capability up to an operating voltage limit;

wherein only the at least one second electromechanical switch is configured with a bounce-free switch-in capability; and wherein the third electromechanical switch and the fourth electromechanical switch have a breaking capability up to a full short-circuit current of 15 kA and a contact resistance of 30μΩ.

2. The switching device according to claim 1, wherein the at least one first electromechanical switch and the at least one second electromechanical switch are respectively provided with an actuator which is actuatable by a low-voltage supply, in order to connect or interrupt the power supply lines of the high-voltage vehicle power supply system.

3. The switching device according to claim 1, wherein the at least one first electromechanical switch is further configured such that, in the event of a failure of the low-voltage supply to the actuator, the at least one first electromechanical switch opens automatically.

4. The switching device according to claim 1, wherein the at least one second electromechanical switch is further configured such that, in the event of a failure of the low voltage supply to the actuator, the at least one second electromechanical switch remains closed.

5. The switching device according to claim 1, wherein the at least one first electromechanical switch comprises a return spring for the opening thereof in the event of a failure of the low-voltage supply to the actuator, wherein the actuator, which includes a solenoid, is de-energized, and thus does not counteract the return spring.

6. The switching device according to claim 1, wherein the at least one second electromechanical switch comprises no return spring for the opening thereof in the event of a failure of the low-voltage supply to the actuator, wherein the actuator, which includes an electric motor including a self-locking spindle, being de-energized, remains in its current position.

7. An electronic control unit for a motor vehicle, for actuating at least two different electromechanical switches of a switching device according to claim 1.

8. An electrically operable motor vehicle comprising a switching device according to claim 1.

* * * * *